Patented Aug. 8, 1972

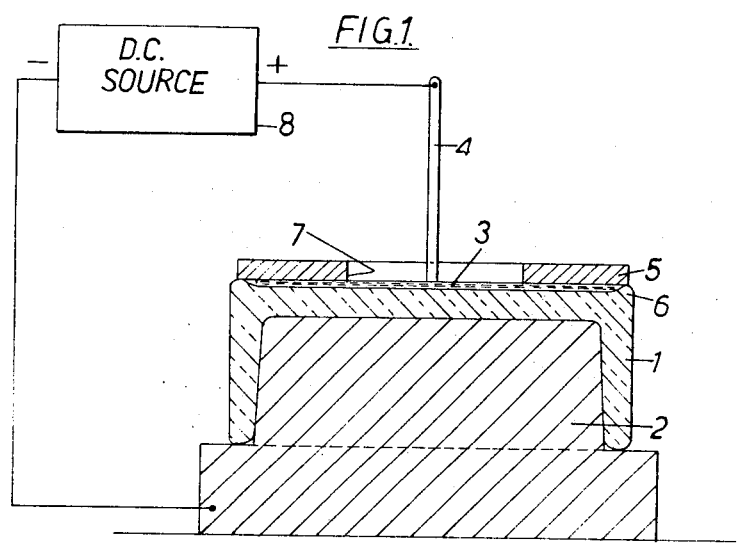
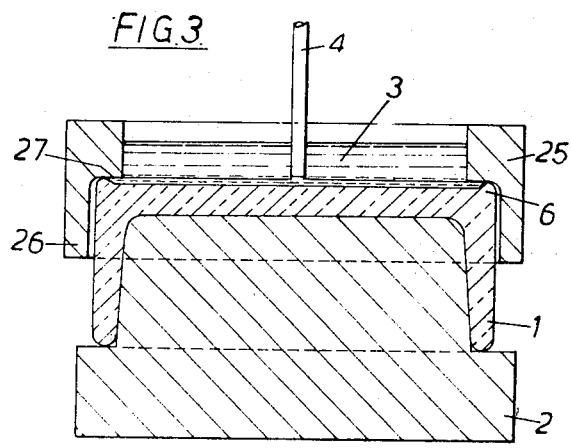

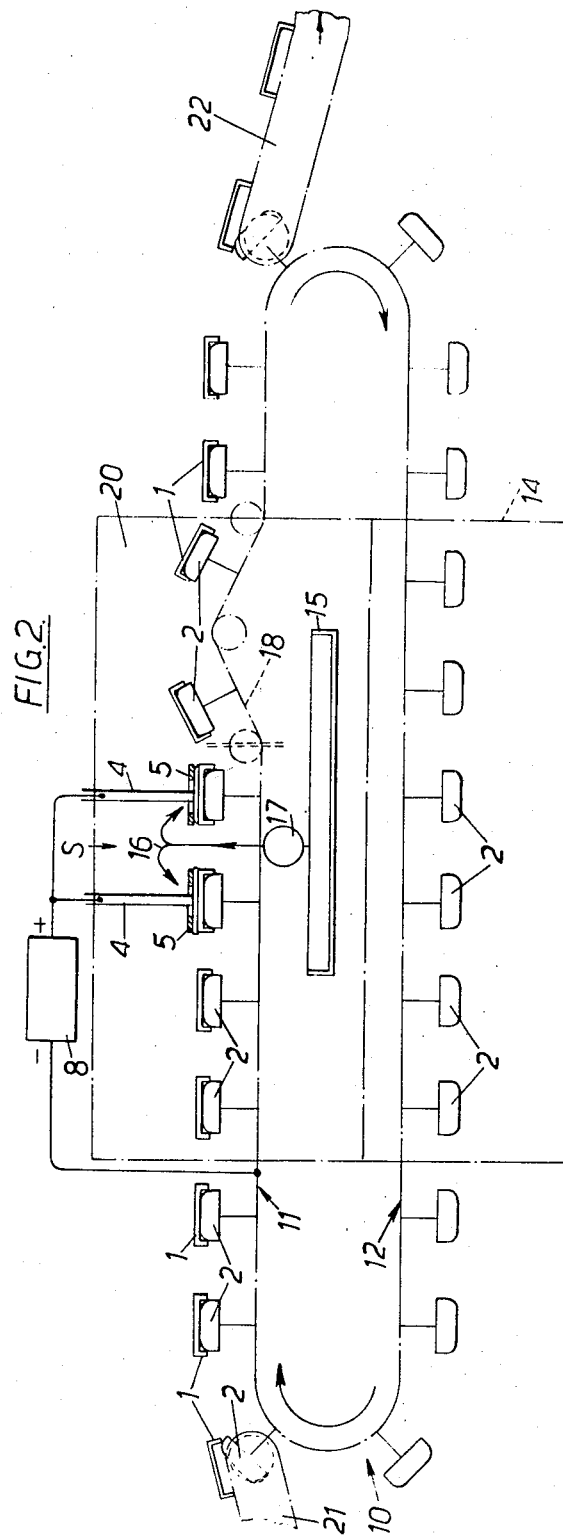

3,682,611
TREATMENT OF HOLLOW GLASS ARTICLES
David Gordon Loukes, Park Prescot, and Jack Lawrensen, St. Helens, England, assignors to Pilkington Brothers Limited, Liverpool, Lancashire, England
Filed Sept. 26, 1969, Ser. No. 861,430
Claims priority, application Great Britain, Oct. 3, 1968, 47,067/68
Int. Cl. C03b 15/14; B27k 3/34; B05c 11/16
U.S. Cl. 65—182                                    5 Claims

ABSTRACT OF THE DISCLOSURE

Hollow glass articles are treated electrolytically by seating each article on a solid electrical conductor contacting one face of the article, contacting the other face with a body of molten electrically conductive material, and passing an electric current from the molten body into the glass to cause a surface change in the article.

Glass articles are tinted by this method, in particular moulded glass articles, e.g. moulded glass half-bricks or tiles, which thereby acquire a desired colour.

BACKGROUND OF THE INVENTION

This invention relates to the treatment of glass articles to impart desired characteristics thereto other than the characteristics inherent in the method of forming the articles. More particularly, the invention concerns methods of and apparatus for effecting surface modification, for example, tinting, of glass articles.

SUMMARY

The invention provides a method and apparatus for treating a glass article to impart desired characteristics to at least one face of the article.

The article, e.g. a hollow moulded glass article or a rolled glass section is contacted at a zone of its surface with a body of molten electrically conductive material, and electrical connection is made with a second surface zone of the article by way of a solid electrical conductor shaped to match the surface configuration of that second zone.

A regulated electric current is then passed between the molten body and the solid conductor, through the glass to modify the face of the article.

BRIEF DESCRIPTION OF THE DRAWINGS

FIG. 1 is a diagrammatic cross-sectional view of apparatus according to one embodiment of the invention, illustrating the treatment of a single hollow glass article, FIG. 2 is a diagrammatic elevational view of apparatus for the treatment of a succession of hollow glass articles continuously, FIG. 3 is a diagrammatic cross-section, corresponding to that of FIG. 1, of an alternative embodiment of the invention.

DESCRIPTION OF THE PREFERRED EMBODIMENTS

Figure 4:
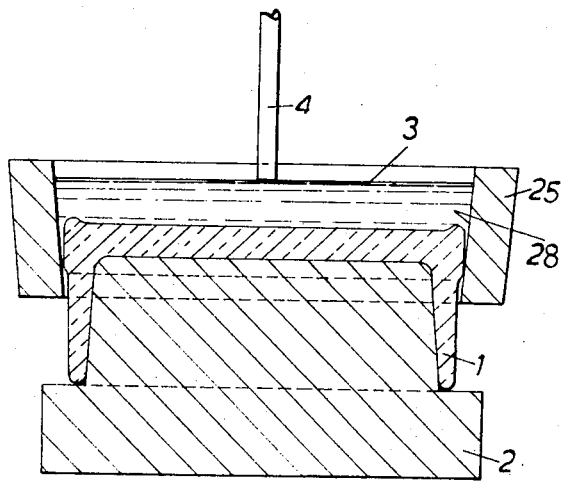
FIG. 4 is a diagrammatic cross-section, corresponding to that of FIG. 3, of a further alternative embodiment of the invention.

In the drawings, the same reference numerals are used to indicate the same or like parts.

The apparatus shown in FIG. 1 is designed to effect surface treatment, for example, tinting, of the outer face of a glass article, in this instance a hollow glass article 1. The article 1 may comprise, for example, a half-brick or tile as shown, or a length of glass having a channel-section, commonly known as "Profilit."

The article 1 is supported for treatment upon a solid electrically conductive support 2 comprising a block of graphite having a surface which fits closely the shape of the inner face of the hollow article 1, so that the block, in addition to supporting the article 1, makes good electrical contact therewith.

Alternatively the support 2 may be of a refractory including powdered conductive material, e.g. graphite or iron filings.

To effect treatment of the article 1 in accordance with the invention, the article and the support 2 are heated to a temperature—typically of the order of 750° C.— at which the glass is susceptible to surface modification by migration of elements into its surface, in a non-oxidising protective atmosphere. A body 3 of electrically conductive molten material containing the element which is to be introduced into the glass is placed in contact with the outer face of the article 1, and electrical contact is made with the body 3 by an electrical conductor 4.

The molten body 3 is maintained in position by a locating member 5 which is juxtaposed to the upper face of the article 1 and which is formed of a material (usually metal) which is wetted by the molten material of the body 3. Consequently the body 3 clings to the locating member 5. Retention of the body 3 on the upper face of the article 1 may alternatively, or additionally, be assisted by the presence of a shallow upstanding ridge 6 around the outer periphery of the outer face of the article 1.

The locating member 5 has a central aperture 7 through which the electrical conductor 4 projects, and through which the material forming the molten body 3 may be introduced.

The constitution of the molten body 3 is selected in accordance with the element which is to be introduced into the glass and may comprise, for example, a molten alloy.

Suitable materials are molten tin or lead or bismuth; or a molten alloy of tin with lithium, sodium, potassium, zinc, magnesium, aluminium, silicon, titanium, manganese, chromium, iron, or one of the rare earth metals. Further the molten body 3 may be an alloy of bismuth or lead with lithium, sodium, zinc, magnesium, aluminium, silicon, titanium, manganese, chromium, iron, cobalt, nickel, copper, silver, gold, antimony, arsenic, indium, or one of the metals of the platinum group, or one of the rare earth metals.

In operation of the apparatus, the electrical conductor 4 is connected to the positive terminal of a direct current electrical source 8 while the support 2 is connected to the negative terminal of said source 8, as shown diagrammatically. A controlled electrical current is passed for a predetermined time to cause current flow from the molten body 3 through the glass article 1 to the solid support 2, thereby causing migration of ions from the body 3 into the glass article 1 to produce desired characteristics. The molten body 3 is then removed, together with the locating member 5 and conductor 4.

Where a colloidal colour is to be struck in the glass article the electrolytic treatment described in the preceding paragraph is followed by a reduction step in which the treated outer face of the article 1 is exposed to a reducing atmosphere. Conveniently the protective atmosphere in which the treatment is carried out may include a reducing constituent: for example said atmosphere may comprise a nitrogen-hydrogen mixture.

As an alternative to locating the molten body 3 on the article 1 by means of the locating member 5 which is separate from the conductor 4, the electrical connection from the source 8 may be made direct to the locating member 5, so that the conductor 4 as such may be dispensed with. Also, repeated electrolytic surface treatments alternating with surface reduction steps, may be effected. Successive treatments with differently constituted molten bodies 3, or with the same body 3 at different temperatures, may be effected in order to produce multiple effects (such as a combination of two colours) in the glass.

In addition to modification of the surface of the article 1 in contact with the molten body 3, modification of the surface in contact with the effective cathode (i.e. the support 2), may result, for example, due to the release of sodium oxide at this surface.

FIG. 2 illustrates diagrammatically a plant for effecting continuous treatment of a succession of hollow glass articles by the method described with reference to FIG. 1, A number of article supports 2, each identical to that shown in FIG. 1, are disposed at intervals along an endless belt conveyor 10, shown in diagrammatic outline. The conveyor 10 has horizontal upper and lower runs 11, 12 which pass through a reheating chamber 14 in which a protective atmosphere comprising a mixture of nitrogen and hydrogen is maintained. The temperature along the chamber 14 is maintained by suitable temperature regulating elements or burners (not shown) at predetermined temperatures at which the glass articles 1 to be treated are susceptible to modification by the ions in question.

Within the chamber 14 a treatment station S is provided as indicated diagrammatically. One or more conductors 4 (in the illustrated example, two conductors 4) and associated locating members 5 are mounted above the upper conveyor run 11 at the treatment zone S. The or each conductor 4 is connected to the positive terminal of a direct current source 8. A single source 8 is shown diagrammatically for convenience; in practice, however, each conductor 4 would be connected to a separate respective source 8 to provide for independent control of each glass article treatment circuit. The negative terminal of the source 8 is connected to the conveyor 10, and thereby to the article supports 2. Conveniently, the negative terminal of the source 8 is earthed.

In this example the inlet end of the chamber is maintained at a temperature of about 600° C. and the articles 1 are heated to about 750° C. as they pass to the treatment zone S.

The conductors 4 are mounted for movement vertically on suitable actuators (not shown) so that the conductors 4 and associated locating members 5 may be moved between lowered, operative positions, as shown, in which they are in juxtaposition to the outer faces of respective hollow articles 1 on the conveyor 10 and raised, inoperative, positions (not shown) in which they are disposed clear of the upper conveyor run 11.

A reservoir 15 for the molten material constituting the body or bodies 3 is disposed in the chamber 14 below the upper conveyor run 11. Nozzles or scoops, indicated diagrammatically at 16, are arranged at the treatment station S and are supplied at controlled intervals with molten material from the reservoir 15 by means of a pump 17 (shown diagrammatically). Each nozzle 16 is arranged, upon operation of the pump 17, to supply a charge of the molten material, to one of the locating members 5 to "wet" the member 5 and form the body 3 between the member 5 and the upper face of the respective article 1. Excess molten material drains back into the reservoir 15.

The plant illustrated in FIG. 2 is arranged to operate in an endless automatic sequence. The conveyor 10 is advanced intermittently, each advancing movement, which moves the article supports 2 a distance equal to the separation of adjacent supports 2, being synchronised with the vertical reciprocation of the electrical conductors 4 and locating members 5. The conveyor 10 "dwells" in each successive position for a predetermined time interval, for example 15 seconds.

Immediately a support 2 carrying an article 1 is aligned directly beneath an electrical conductor 4 and the conveyor "dwell" begins, the conductor 4 and locating member 5, which were initially in their raised positions, are lowered into their operative positions. A charge of molten material (e.g. molten alloy) is then applied to the member 5 and enters the space between the member 5 and the outer face of the article 1 through the central aperture 7 to form the molten body 3. When the body 3 has been formed the current is switched on and passes for a fixed time interval, for example 5 seconds, after which the conductor 4 and locating member 5 are raised. The end of the conveyor dwell period is then reached and the conveyor advances to bring the next article 1 to be treated into position beneath the conductor 4.

When the conductor 4 and locating member 5 are raised at the end of the treatment sequence most of the molten material of the body 3 falls off the article 1 back into the reservoir 15. The entire sequence is carried out automatically.

In practice an array of several conductors 4 and locating members 5, supported for movement on a common actuator, could be provided, the conductors 4 being spaced apart at intervals equal to the spacing between adjacent article supports 2. In this way each article 4 is subjected to a succession of electrolytic surface treatments, each identical to that described with reference to FIG. 1.

To assist removal of the molten material from the treated article 1 a blast of the gaseous mixture in the chamber 14 may be directed at the outer face of each article after the conductor 4 and locating member 5 have been raised therefrom. This blast may be applied following the final treatment (where more than one conductor 4 is provided) or between successive treatments, particularly when colloidal colours are to be formed in the surface of the article; the exposure of the treated surface of each article 1 to the reducing atmosphere in the chamber 14 after the or each electrolytic treatment causes the colours to be "struck" or developed in the surface.

Alternatively, or in addition, the final electrolytic treatment position in the chamber 14 may be followed, as shown in outline, by a portion 18 of the conveyor upper run 11 which is inclined to the horizontal: any molten material on the outer face of the treated article falls back into the reservoir 15 as the article traverses the inclined portion 18.

Upon leaving the treatment station S the treated articles on the conveyor upper run 11 pass through a cooling zone 20 in the chamber 14, where the temperature is maintained at about 600° C. It is in this zone that the action of the reducing gas in the protective atmosphere causes colloidal colours to be "struck" or developed.

At the input end of the conveyor upper run 11 a forked end of a supply conveyor 21 (part only of which is shown) is juxtaposed to the conveyor 10 and arranged so that, as illustrated, returning empty supports 2 engage beneath respective articles 1 to remove them in succession from the conveyor 21, which may lead direct from an article moulding apparatus (not shown). It is conveniently arranged that the shape of each article support 2 conforms closely to that of the male mould member of the article moulding apparatus.

At the discharge end of the conveyor upper run 11 a forked end of a discharge conveyor 22, similar to that of the supply conveyor 20, is arranged to remove the treated articles automatically from the conveyor 10. The discharge conveyor 22 leads directly to a lehr or welding apparatus (not shown).

The greater part of the lower (return) run 12 of the conveyor 10 is also disposed in the chamber 14. In this way the empty article supports 2 are protected from oxidation and are maintained at high temperature.

FIGS. 3 and 4 show alternatives to the apparatus of FIG. 1 in which the molten body 3, instead of being located by a locating member 5 which is wetted by the body 3, is retained by an annular retaining member 25 which fits closely around the outer periphery of the outer face of the article 1 to form a bath in which a body 3 of the molten material may be placed. The member 25 is formed of material such as graphite which is not wetted by the molten body 3. Because the area of contact of the member 25 with the article 1 is small, current leak through the member 25 is in practice negligible.

In FIG. 3 the retaining member 25 has a lower part 26 of greater internal dimensions than the outer dimensions of the article 1 and terminating in an inwardly extending shoulder 27 which rests on the upstanding peripheral ridge 6 of the article 1.

In FIG. 4 the retaining member 25 has a frusto-conical internal surface 28 which engages the outer peripheral surface of the article 1 by a wedging action, the article 1 being fitted into the retaining member 25 from above. When using such an arrangement in a continuous conveyor system such as that of FIG. 2 the retaining members 25 are placed on the respective supports 2 before the articles 1. Alternatively, the members 25 may comprise multiple parts which are brought together around each article 1 at the treatment zone S.

The apparatus according to the invention permits treatment of hollow glass articles at high temperatures, for example up to 900° C. (the temperature required to cause migration of cobalt into glass to impart a characteristic blue colour thereto), without any deformation of the articles occurring: the solid support 2, fitting closely the inner face of the article 1, provides a positive support for the article 1 throughout the treatment process.

It should be noted that, by placing the molten body 3 on top of the face of the article 1 to be treated, it is ensured that any dross in the molten body 3, which floats upwards, moves away from the surface under treatment.

In the embodiments so far described, each conductive article support 2 supports directly the entire weight of the article 1 to be treated. In some cases it may be preferable to support only part of the weight of the article 1 directly by means of the support 2, particularly where, as illustrated diagrammatically in FIG. 5, electrical contact between the article 1 and the support 2 is effected by means of an intermediate layer of molten metal 30.

Figure 5:
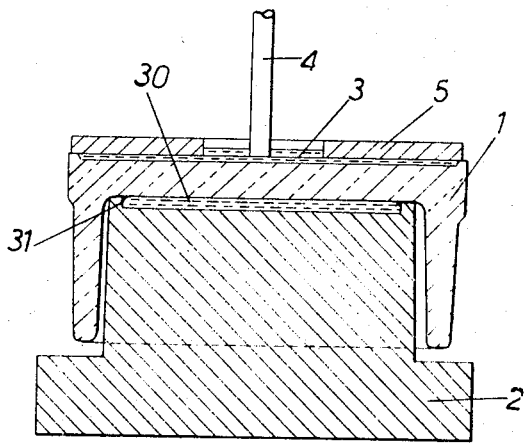
FIG. 5 is a diagrammatic cross-section, corresponding to that of FIG. 1, of another alternative embodiment of the invention.

In FIG. 5 the molten metal, for example, tin, of the layer 30 is such that it does not wet the support 2 (which in this case is graphite), the latter having a peripheral ridge 31 to provide partial direct support for the article 1 and to assist in retaining the molten layer 30. The main support for the article 1 may alternatively be provided by pads or rollers (not shown) which engage downwardly facing surfaces of the article 1.

It will be appreciated that the invention is applicable to the treatment of glass articles other than hollow articles as in the examples specifically illustrated. For example, the bottom face of a glass article of cubic shape may be treated by contact with molten metal, acting as an anode, in which the article floats with a solid metal or graphite cathode being held in contact with the upper face of the article. Also, the invention, particularly when embodied as in FIG. 5, may also be used with an alternating current source to effect treatment of two faces of an article simultaneously.

Figure 6:
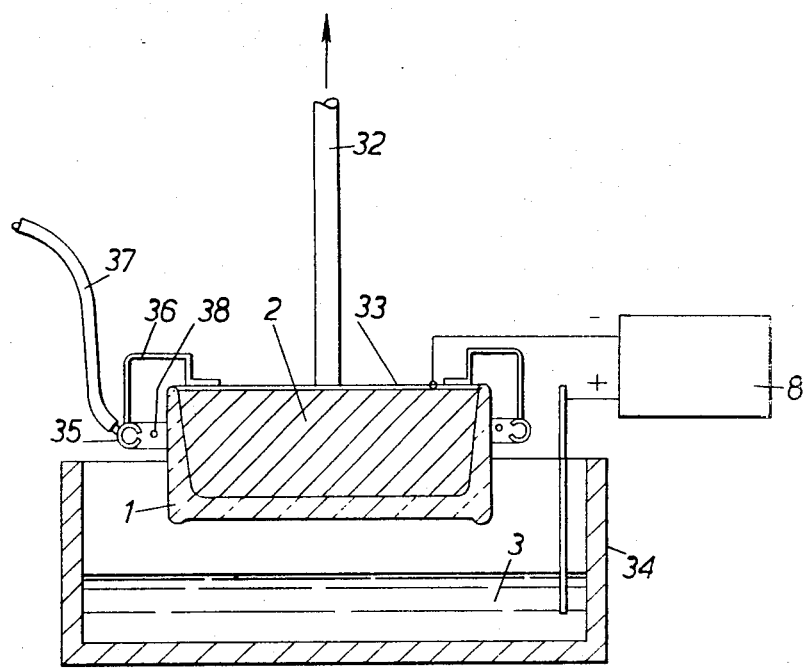
FIG. 6 is a diagrammatic cross-section of apparatus according to a further embodiment of the invention.

FIG. 6 illustrates a further alternative embodiment, again illustrated as applied to the treatment of a hollow glass article 1. The article 1 fits over a solid electrically conductive block 2 of porous carbon having an external surface conforming to the internal surface of the article 1 so that electrical contact is established between the article 1 and the block 2. In this embodiment the article 1 is disposed in an inverted position and is retained in close contact with the block 2 by the application of suction to the block 2 through a vacuum line 32. The surface of the block 2 which is not contacted by the article 1 is provided with a non-porous covering, for example, a metal plate 33.

To ensure good electrical contact between the block 2 and the article 1 the article-contacting surfaces of the block 2 are covered with carbon cloth or steel wool. This is particularly useful if the article has a ribbed, curved or figured surface contacted by the solid conductor.

By using suction to retain the article 1 on the block 2, the surface of the article 1 to be treated may be disposed lowermost and the article 1, supported on the block 2, lowered into a body 3 of the molten material contained in an open-topped bath 34. A reducing atmosphere, for example, a mixture of nitrogen and hydrogen, is maintained over the surface of the body 3. Jets of this reducing atmosphere are directed onto the surface of the article 1 (in this case the skirts thereof) which are not to be treated in order to maintain these surfaces at a lower temperature than the treated surfaces. For this purpose the sides of the article 1 are surrounded by an annular manifold 35 which is secured to the plate 33 by brackets 36 and which is supplied with the reducing atmosphere through a line 37. The manifold 35 is formed with apertures 38 which direct jets of reducing atmosphere onto the external surfaces of the skirts of the article 1. In this way the skirts of the article 1 may be maintained at, for example 600° C. while the molten body 3 is at 900° C. and the atmosphere above the body 3 is at 750° C.

The treatment of the article 1 is effected electrolytically by connecting the body 3 and the block 2 to the positive and negative terminals respectively of a direct current source 8. Alternatively, an alternating current source may be used, current passing into the glass from the body 3 during the half-cycles when the body 3 is positive with respect to the block 2.

The article 1 is lowered into contact with the body 3 which may be, for example, a molten copper/bismuth alloy, and current passed for a few seconds, after which the article is withdrawn from the body 3 and held in the reducing atmosphere for a longer period (e.g. 3 minutes) to "strike" a colloidal copper ruby colour in the glass surface.

In a production method for treating a succession of articles, the articles may be picked up from a conveyor by means of respective blocks 2 to which suction is applied, withdrawn to a treatment chamber, and then returned to the conveyor, whereupon the suction is released to deposit the treated article on the conveyor. Alternatively, a continuous method may be employed in which the articles are passed on a conveyor through a treatment station, at which they are dipped successively in a bath of molten material, as described with reference to FIG. 6, and are then passed through a reduction zone in a reducing atmosphere.

The advantages of using suction to support the article 1 on the block 2 are that deformation, specifically outward bowing, of the side wall or skirt of the article is substantially prevented, and electrical contact with the conductive block 2 is enhanced.

The apparatus illustrated in FIG. 6 can be modified to provide an arrangement similar to that of FIG. 5 by providing a layer of molten metal in the internal surface of the article 1, electrical contact between the solid conductive block 2 and the article 1 being effected by means of the layer of molten metal. Contact may also be effected by means of a shoulder on the block 2 which engages the edge of the skirt of the article 1—that is, the edge disposed uppermost in FIG. 6. A seal for the suction applied to the block 2 is also effected at this shoulder.

Alternatively, the layer of molten metal on the internal surface of the article 1 may be spaced from the surface of the block 2, the layer being typically about ⅜ inch deep, and electrical contact to the molten metal layer being established through an adjustable electrical contact needle extending into the layer from the block 2. The weight of the molten metal layer on the internal surface of the block serves to counteract any tendency of the glass to bow under the influence of suction applied to the block 2.

We claim:

1. Apparatus for treating the outer surface of a hollow glass article to impart desired characteristics to at least one face of said outer surface of the article, comprising, means for thermally conditioning the article so that it is at a temperature at which it is susceptible to surface modification, a solid supporting member of electrically conductive material having a shape so as to fit closely within the entire confines of the hollow in the thermally conditioned article and to make electrical contact with an inner face of the article opposite said at least one face of said outer surface to be treated, a body of molten electrically conductive material for modifying said at least one face of said outer surface of the article, a locating member juxtaposed to said solid supporting member to engage the article adjacent said at least one face of said outer surface of the article and retain in contact with said at least one face of said outer surface of the article said body of molten electrically conductive material, and means providing an electric current source connected to said solid supporting member and to the molten body to cause current flow from the molten body through the article to the solid member.

2. Apparatus according to claim 1, wherein the locating member is formed of a material to which the molten material clings.

3. Apparatus according to claim 1, wherein the locating member is an annular retaining member which fits closely around the outer surface of said article.

4. Apparatus according to claim 1, wherein the locating member is formed with an internal surface of frusto-conical configuration to engage over the outer surface of the article.

5. Apparatus according to claim 1 for treating a succession of said hollow glass articles to impart desired characteristics to said at least one face of the said outer surface of each article, comprising said locating member, a plurality of said solid supporting members, and enclosure providing said thermal conditioning means for thermally conditioning said articles, a conveyor on which are disposed said plurality of said solid supporting members, means for respectively placing articles for treatment on and removing said articles from the supporting members at opposite respective ends of the conveyor, said locating member and at least a portion of said means providing said electric current source being movably mounted at a zone within said enclosure through which said conveyor is operative to successively move said solid supporting members, the apparatus further including means maintaining a protective inert or reducing atmosphere in said enclosure, a supply reservoir of the said molten material, means for feeding molten material from said reservoir to successive articles in the enclosure, and means for removing the molten material from the treated articles in the enclosure and returning said material to the reservoir.

References Cited

UNITED STATES PATENTS

| | | | |
|---|---|---|---|
| 1,692,920 | 11/1928 | Baker | 118—504 |
| 2,067,949 | 11/1937 | Rez | 65—60 |
| 2,179,317 | 11/1939 | Barnard | 65—184 X |
| 2,264,499 | 12/1941 | Bair | 65—60 X |
| 2,248,714 | 7/1941 | Lytle | 65—60 |
| 2,639,392 | 5/1953 | Warner Jr. | 118—505 X |
| 2,968,578 | 1/1961 | Mochel | 65—30 X |
| 2,979,024 | 4/1961 | Pellekhan | 118—504 X |
| 3,213,338 | 10/1965 | Quinn et al. | 65—60 X |
| 3,218,220 | 11/1965 | Weber | 65—30 X |
| 3,393,987 | 7/1968 | Plumat | 65—30 X |
| 3,429,742 | 2/1969 | Grego et al. | 65—30 X |
| 3,467,508 | 9/1969 | Luukes et al. | 65—30 X |
| 3,468,745 | 9/1969 | Navez et al. | 65—60 X |
| 3,486,995 | 12/1969 | Evers | 65—30 X |
| 3,528,847 | 9/1970 | Grego et al. | 65—60 X |

FRANK W. MIGA, Primary Examiner

U.S. Cl. X.R.

65—30, 58, 60; 118—505; 117—148